(12) United States Patent
Kim (10) Patent No.: US 11,165,759 B2
(45) Date of Patent: Nov. 2, 2021

(54) DATA ENCRYPTION AND DECRYPTION PROCESSING METHOD IN CLOUD NETWORK ENVIRONMENT

(71) Applicant: SPICEWARE CO., LTD., Seongnam-si (KR)

(72) Inventor: Keun Jin Kim, Seoul (KR)

(73) Assignee: SPICEWARE CO., LTD., Seongnam-si (KR)

( * ) Notice: Subject to any disclaimer, the term of this patent is extended or adjusted under 35 U.S.C. 154(b) by 145 days.

(21) Appl. No.: 16/804,738

(22) Filed: Feb. 28, 2020

(65) Prior Publication Data

US 2020/0204528 A1      Jun. 25, 2020

Related U.S. Application Data

(63) Continuation of application No. PCT/KR2018/009770, filed on Aug. 24, 2018.

(30) Foreign Application Priority Data

Aug. 31, 2017   (KR) .......................... 10-2017-0111505

(51) Int. Cl.
*H04L 29/06*   (2006.01)
*G06F 21/60*   (2013.01)
(Continued)

(52) U.S. Cl.
CPC ........ *H04L 63/0471* (2013.01); *G06F 21/602* (2013.01); *G06F 21/6227* (2013.01); *H04L 67/02* (2013.01); *H04L 67/10* (2013.01)

(58) Field of Classification Search
CPC .................................................. H04L 63/0471
See application file for complete search history.

(56) References Cited

U.S. PATENT DOCUMENTS

| 2015/0178506 A1* | 6/2015 | Elovici ................. H04L 9/0894 713/189 |
| 2018/0041343 A1* | 2/2018 | Chen ..................... H04L 67/025 |
| 2018/0341986 A1* | 11/2018 | Ma ..................... G06Q 30/0267 |

FOREIGN PATENT DOCUMENTS

| JP | 2006-243924 A | 9/2006 |
| JP | 2016-206918 A | 12/2016 |

(Continued)

OTHER PUBLICATIONS

International Search Report issued in PCT/KR2018/009770; dated Nov. 26, 2018.

*Primary Examiner* — Simon P Kanaan
(74) *Attorney, Agent, or Firm* — Studebaker & Brackett PC (57) ABSTRACT

A data encryption/decryption method including a web server, a web application server (WAS) receiving data, a database server (DB server) receiving a structured query language (SQL), and an encryption/decryption server to the WAS through a network, the data being transmitted between the encryption/decryption server and the WAS by an application repeater, the method includes performing encryption by filtering an encryption target by using a uniform resource identifier (URI) when the data is transmitted from the web server and transmitting data to be encrypted to the encryption/decryption server, and performing decryption by filtering a decryption target by using the SQL input from the WAS to the DB server and transmitting data to be decrypted to the encryption/decryption server.

5 Claims, 5 Drawing Sheets

(51) Int. Cl.
　　　*G06F 21/62*　　　　(2013.01)
　　　*H04L 29/08*　　　　(2006.01)

(56) References Cited

FOREIGN PATENT DOCUMENTS

| KR | 10-2008-0037284 A | 4/2008 |
| KR | 10-2010-0112298 A | 10/2010 |
| KR | 10-2011-0127789 A | 11/2011 |

\* cited by examiner

DATA ENCRYPTION AND DECRYPTION PROCESSING METHOD IN CLOUD NETWORK ENVIRONMENT

CROSS-REFERENCE TO RELATED APPLICATIONS

The present application is a continuation of International Patent Application No. PCT/KR2018/009770, filed on Aug. 24, 2018 which is based upon and claims the benefit of priority to Korean Patent Application No. 10-2017-0111505 filed on Aug. 31, 2017. The disclosures of the above-listed applications are hereby incorporated by reference herein in their entirety.

BACKGROUND

Embodiments of the inventive concept described herein relate to a data encryption and decryption processing method in a cloud network environment, and more particularly, relate to a data encryption/decryption processing method through an automatic collection, an analysis, and a change of a request URI and parameter and an SQL and SQL parameter in a system implemented in Java.

According to 'Privacy Act', 'Enforcement Decree of the Personal Information Protection Act', and 'Personal Information Stability Measure Standard', personal information of all DBs is encrypted and stored. To build a database encryption in a traditional way, the requirements of the above statutes may be met when it is developed by itself or a database encryption solution is installed.

In the case of the existing homepage or system, encryption/decryption processing is being made by using two methods to purchase a solution developed by itself.

The first method is constructed by transmitting data received from a user to a device that processes separate encryption/decryption on a program (WAS) processing data in an API manner, and then storing the converted data in a database. To implement the above manner, programs for encryption/decryption processing must be identified in the service program currently being processed, and a lot of manpower, time, and cost are generated according to the difficulty of development.

The second method is a plug-in method that installs the solution directly to the database of the user and automatically performs an encryption/decryption operation in a database server when storing or querying data in the database. In this case, it is easy to apply the above method because an application is not changed. However, the additional use of server resources of the database itself is required, and in particular, it cannot be installed when the database is built and serviced by rental type in the cloud environment.

Even though the database is being serviced by a server that is not leased, a target for encryption/decryption is added to cause a change in the plan of the database. Likewise, after installation, application tuning (Modifying) will be performed; in some cases, performance decreases, during maintenance related to database performance by the database manufacturer.

When the encryption/decryption environment is constructed in this way, a lot of manpower and time are required to identify an application to be encrypted/decrypted in proportion to a scale currently constructed; depending on the scale after the target identification, the change requires a lot of time and staffs for change development and tuning.

Recently, as the cloud environment is becoming more common, rather than building a server and providing a service, most new services are provided by using rent virtual machine server instances of the cloud environment as a pay-as-you-go basis, and a myriad of services are born and gone. For these developers, developing DB encryption required by the Personal Information Protection Act is often ignored for reasons of time and cost, and it is often opened first in a manner "Security is later, service development first." When a lot of members are gathered by the success of the built service, in some cases, a hacking accident is taken due to weak security. Therefore, it is necessary to devise a method that may quickly and easily perform encryption/decryption of personal information without wasting money.

SUMMARY

The inventive concept provides a method for encrypting or decrypting data by using a cloud network environment.

The technical objects of the inventive concept are not limited to the above-mentioned ones, and the other unmentioned technical objects will become apparent to those skilled in the art from the following description.

In accordance with an aspect of the inventive concept, there is provided a data encryption/decryption method including a web server, a web application server (WAS) receiving data from the web server, and a database server (DB server) receiving an SQL from the web application server, the method includes (a) filtering an encryption/decryption target by using a URI during the database input to transmit the data that is used to the encryption/decryption target to an encryption/decryption server, (b) filtering the encryption/decryption target by using the SQL that is input from the web application server to the DB server to transmit the data that is used to the encryption/decryption target to the encryption/decryption server, (c) allowing the encryption/decryption server to encrypt the data and to store an encrypted value, and (d) transmitting an encryption record storage identification value corresponding to the encrypted value the encrypted value from the encryption/decryption server to the web application server, wherein the encryption/decryption server is connected to the web application server in a network, data is transmitted between the encryption/decryption server and the web application server by using an application repeater of the encryption/decryption server, and steps (a) and (B) may be selectively performed.

The other detailed items of the inventive concept are described and illustrated in the specification and the drawings.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Hereinafter, embodiments of the inventive concept will be described in detail with reference to the accompanying drawings, and the same or similar components will be given the same reference numerals regardless of the reference numerals, and redundant description thereof will be omitted. The suffix "part" for components used in the following description is given or mixed in consideration of ease of specification, and does not in itself have a meaning or role. In addition, in describing the embodiments disclosed herein, when it is determined that the detailed description of the related known technology may obscure the gist of the embodiments disclosed herein, the detailed description thereof will be omitted. In addition, the accompanying drawings are intended to facilitate understanding of the embodiments disclosed herein, but are not limited to the technical spirit disclosed herein by the accompanying drawings, all changes included in the spirit and scope of the inventive concept, it should be understood to include equivalents and substitutes.

Terms including ordinal numbers such as first and second may be used to describe various components, but the components are not limited by the terms. The terms are used only for the purpose of distinguishing one component from another.

An expression in the singular encompasses the expression in the plural unless the context clearly indicates otherwise.

In the present application, the term "comprises" or "having" and the like is intended to indicate that there is a feature, number, step, operation, component, part, or combination thereof described in the specification, one or the same. It is to be understood that the present invention does not exclude in advance the possibility of the presence or the addition of other features, numbers, steps, operations, components, parts, or a combination thereof.

Figure 1:
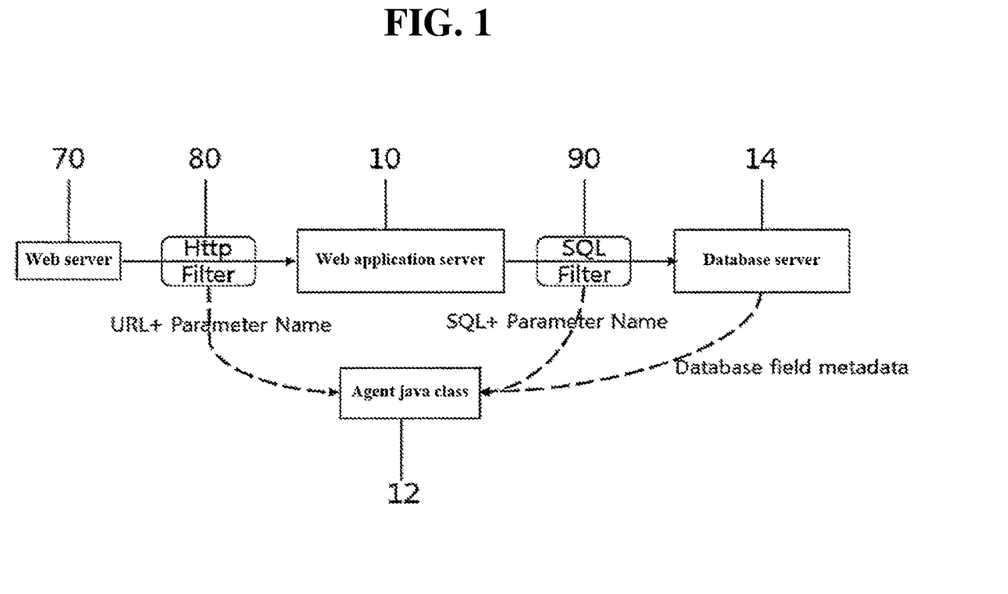
FIG. 1 is a schematic diagram of an application target system related to the inventive concept.
Figure 2:
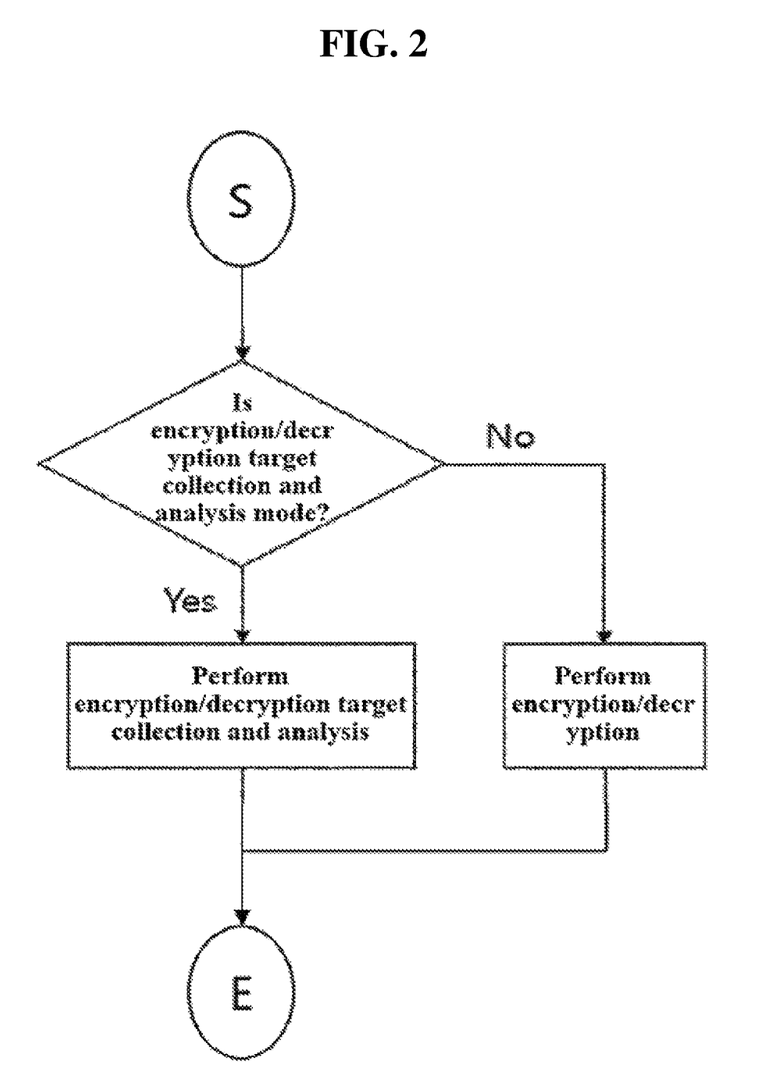
FIG. 2 is a flowchart for determining whether an encryption/decryption is performed by the Java agent class related to the inventive concept.
Figure 3:
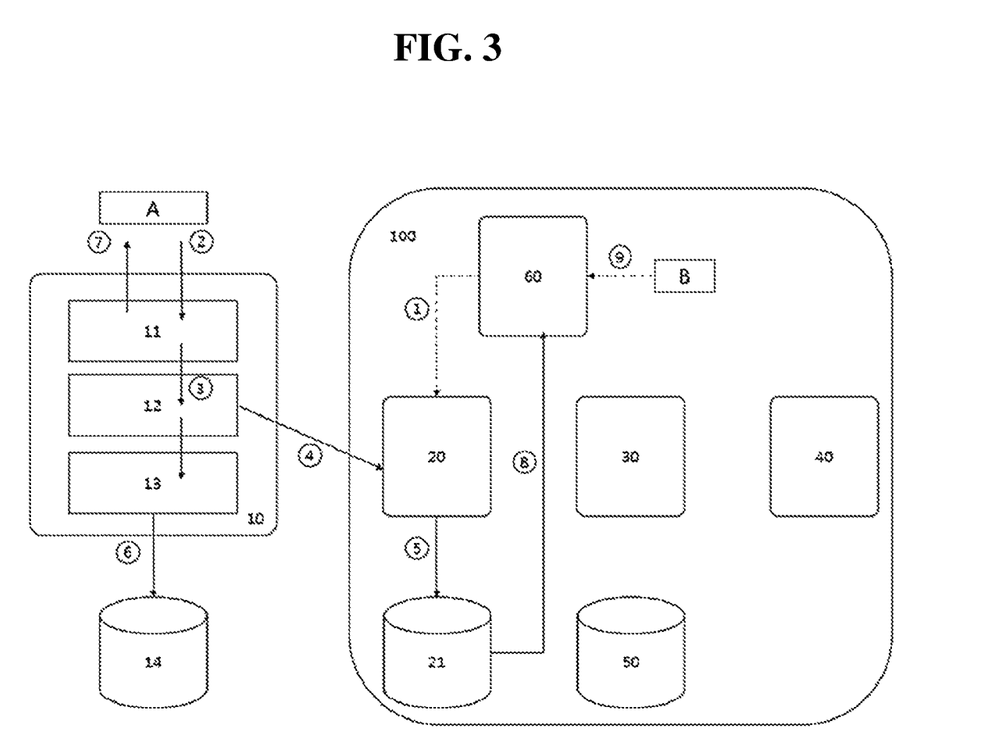
FIG. 3 is a flowchart for describing a process of collecting a data encryption/decryption target related to the inventive concept.
Figure 4:
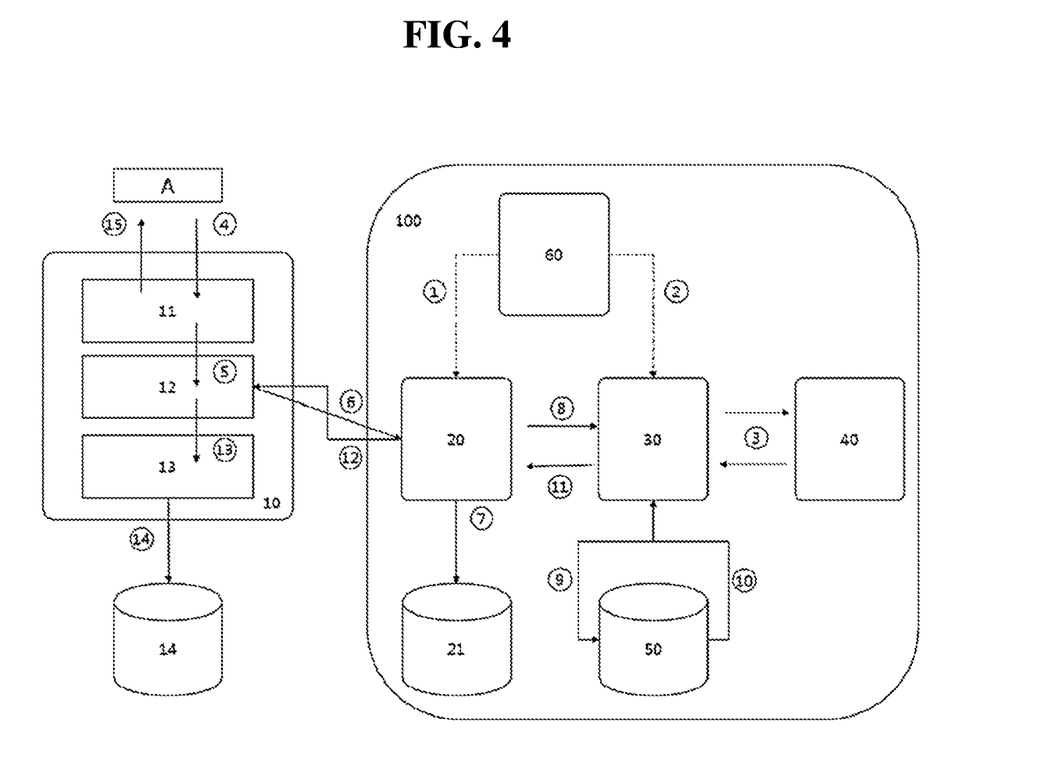
FIG. 4 is a data encryption flowchart related to the inventive concept.
Figure 5:
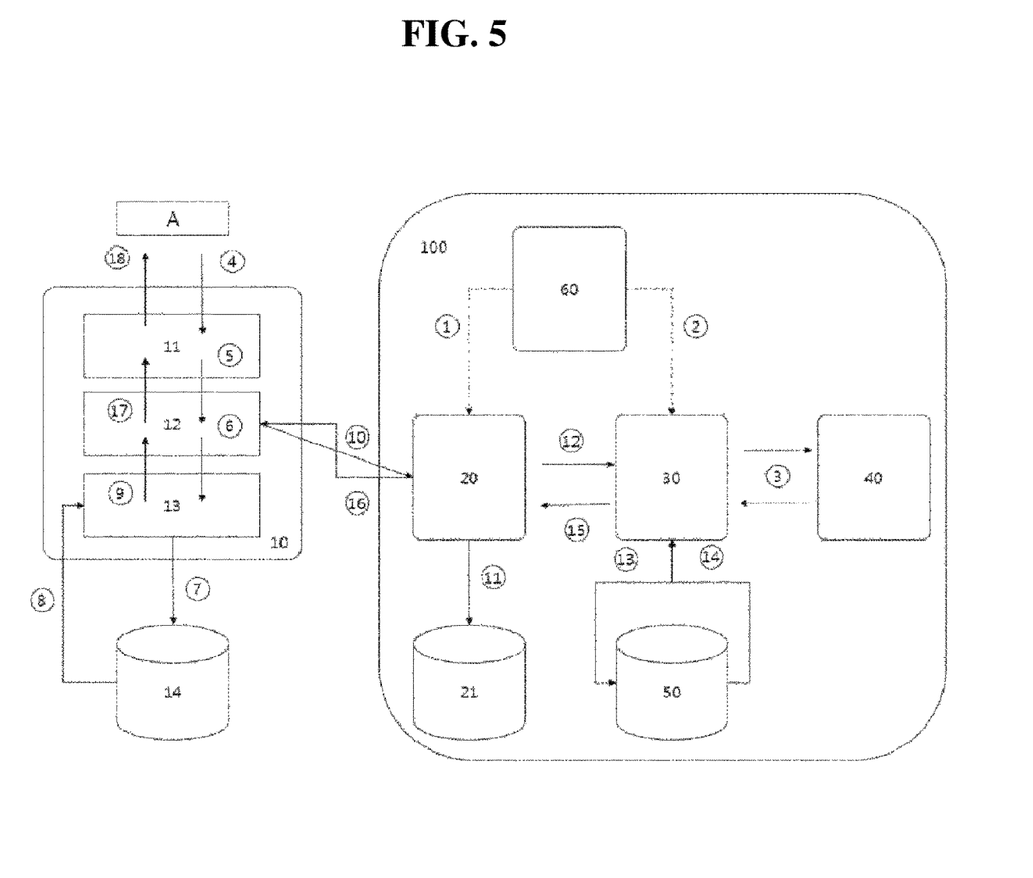
FIG. 5 is a data decryption flowchart related to the inventive concept.

FIG. 1 is a schematic diagram of an application target system related to the inventive concept, FIG. 2 is a flowchart for determining whether to perform encryption/decryption function and an encryption/decryption target collection function related to the inventive concept, FIG. 3 is a flowchart for describing a process of collecting a data encryption/decryption target related to the inventive concept, FIG. 4 is a data encryption flowchart related to the inventive concept, and FIG. 5 is a data decryption flowchart related to the inventive concept.

Hereinafter, an encryption/decryption method related to the inventive concept will be described with reference to FIGS. 1 to 4.

The encryption/decryption method according to an embodiment of the inventive concept relates to an encryption/decryption method, as illustrated in FIG. 1, in a system that includes a web server 70, a web application server 10 (WAS) for receiving personal information from the web server 70, and a database server 14 (DB Server) for receiving a structured query language (SQL) from the web application server 10. In this case, a URL that includes an input of the personal information or parameter information is selectively input to the web application server 10 by a http filter 80. As in the above description, the information input from the web application server 10 to the database server 14 is the SQL filtered by a SQL filter 90 or the parameter information, the filtered information is optionally entered into the database server 14. In this case, the optionally input URL, SQL, or parameter information is subject to encryption/decryption. In addition, in an embodiment of the inventive concept, data may be encrypted/decrypted by the database field metadata of the database server 14.

An embodiment of the inventive concept relates in particular to an encryption/decryption method in a system further including an encryption/decryption server 100. In this case, the encryption/decryption server 100 is connected to the web application server 10 and/or the database server 14 by a network, and may encrypt/decrypt the database without changing the web application server 10. In this case, data are exchanged between the encryption/decryption server 100 and the web application server 10 by an application repeater 20 of the encryption/decryption server 100. The encryption/decryption server 100 may be leased in a cloud environment.

More specifically, a configuration of the encryption/decryption system in an embodiment of the inventive concept, as illustrated in FIG. 3, includes the web application server 10 for processing the personal information input by the user, the database server 14 connected to the web application server 10 to collect encrypted/decrypted data, and the encryption/decryption server 100 for encrypting/decrypting data by data communication with the web application server 10.

The web application server 10 includes an application java class 11 for processing the personal information of the target system input to the web application server 10, an agent Java class 12 connected and installed to the web application server 10 by the network, and a java development kit (JDK) and java database connectivity (JDBC) Java class 13 installed to the web application server 10.

In addition, the encryption/decryption server 100 may include the application repeater 20 for relaying data to the web application server 10 and an encryption/decryption performing device 30, a transaction store 21 for storing the data collected by the repeater 20 for analysis, an encryption/decryption processing device (server) 30 for performing an encryption/decryption, a storage device (server) 40 for storing an encryption key value required for the encryption/decryption processing, an encryption storage 50 for storing actually encrypted data and for issuing arbitrary values, and an encryption/decryption management control device (server) 60 for turning on and off the components and storing and transmitting various setting information. The encryption key storage device 40 provides different encryption keys depending on the web application server 10.

The application java class 11 and the JDBC Java class 13 are components that are installed on the web application server 10; in an embodiment of the inventive concept, the agent Java class 12 is further added.

FIG. 2 is a flowchart for determining whether to perform encryption/decryption related to the inventive concept, and FIG. 3 is a data flowchart of a core component for collecting and an analyzing an encryption/decryption target related to the inventive concept. Hereinafter, a description will be given with reference to FIGS. 2 and 3.

First, referring to FIG. 2, to encrypt/decrypt the personal information of the user, a procedure of determining whether information input or requested among various information input by the user is a target of encryption/decryption should be preceded. For example, when the user enters the personal information to log in to a particular site or to purchase an item, the personal information may be encrypted/decrypted; when the personal information does not need to view general information, the personal information does not need to be encrypted/decrypted.

In an embodiment of the inventive concept, the personal information that is targeted for encryption/decryption is encrypted/decrypted when entered as a specific URL and a URL related parameter, and the SQL and a SQL related parameter. More specifically, when the user enters a social security number for membership in a specific site, and when the URL for entering the social security number and the parameter related to the social security number are entered, it is determined that the personal information is targeted for encryption/decryption by the URL input by the user, and the social security number (parameter input together with the URL) input together is encrypted/decrypted. The URL is described merely as an example, and a uniform resource identifier (URI) may be used.

The above description is also applied to the case where an account number is entered while purchasing goods on a specific site. That is, it is determined whether to encrypt/decrypt the account number, which is a parameter input together with the URL for purchasing the goods, the account number is encrypted/decrypted when it is determined that the account number is targeted for encryption/decryption.

The above description is also applied to the case where the SQL and the parameter corresponding to the SQL are input. That is, whether to encrypt/decrypt input information is determined by the input SQL, and a parameter input together with the SQL targeted for encryption/decryption is encrypted/decrypted.

Whether the data is targeted for encryption/decryption in the above procedure is filtered by the http filter 80 and the SQL filter 90.

Afterwards, when the URL (SQL) and the parameter that are determined as the encryption/decryption target are input, the corresponding parameter is automatically encrypted/decrypted. To this end, in an embodiment of the inventive concept, whether the encryption/decryption is executed is recorded at the transaction store 21 of the encryption/decryption server 100. In this case, the parameter may be, but is not limited to, a resident registration number, a date of birth, a telephone number, a card number, an account number, an ID, a password, and the like.

That is, whether a current mode is a mode to collect and analyze an encryption/decryption object is determined; when the current mode is determined as the object collecting and analyzing mode (Yes), the URI, SQL, or related parameter information to be encrypted/decrypted is collected and analyzed. If not (No), the encryption/decryption is performed.

As such, first, the URL and the parameter of the URL, and the SQL and the parameter of the SQL that are to be encrypted/decrypted are collected, and the encryption/decryption is performed on targets to be encrypted/decrypted among an URL and a parameter of the URL and a SQL and a parameter of the SQL input after the collection. Otherwise, a request of the user may be bypassed without modification, and the existing general web processing process proceeds.

Hereinafter, a procedure for collecting and analyzing an encryption/decryption target will be described in more detail with reference to FIG. 3.

First, the encryption/decryption management control device (server) 60 issues a command to collect an encryption/decryption target URI/SQL (transaction) of the web application server 10 to the application repeater 20 (①). A user A of the web application server 10 inputs the personal information (②), and the java class 11 processing the personal information is in the middle of processing the personal information input by the user A, the agent Java class 12 inserts a collection code (③) through the Java class byte code instrumentation (BCI) during Java runtime. By obtaining the information of the user A in the middle of execution, a copy of the data input by the user A is sent to the application repeater 20 (④).

After that, when the application repeater 20 receives the encryption/decryption target URI/SQL (transaction), the application repeater 20 stores the encryption/decryption target URI/SQL (transaction) in the transaction store 21 (⑤). As the agent Java class 12 transmits the data to the JDK and JDBC Java class 13 such that the data input by the user A is stored in the database server 14 after completion of data transmission to the application repeater 20, the data of the user A is stored in the database server 14 (⑥). At this time, the encryption/decryption is not performed.

The user A receives a response from the java class 11 for processing the personal information that the data entered by the user A is normally stored in the database server 14 (⑦). As a target system administrator, a user B searches through the encryption/decryption management control device (server) 60 and the user A and a number of transaction data that are collected in the transaction store 21, and then identifies the encryption/decryption collection target transaction, the identified transaction is stored in the transaction store 21. (⑧, ⑨)

As described above, when the personal information or URI (SQL) of the encryption/decryption target is determined, the personal information is encrypted or decrypted.

FIG. 4 is a data flow diagram of core components for an encryption related to the inventive concept, hereinafter, an encryption of data according to an embodiment of the inventive concept will be described with reference to FIG. 4.

First, the encryption/decryption management control device (server) 60 in the encryption/decryption server 100 issues an encryption/decryption start command to the application repeater 20 (①). The encryption/decryption management control device (server) 60 issues the encryption/decryption start command to the encryption/decryption processing device (server) 30 (②). The encryption/decryption processing device (server) 30 that receives the encryption/decryption start command receives a symmetric encryption key required to perform the encryption/decryption from the encryption key storage device (server) 40 (③). The personal information is received from the user A of the web application server 10 (④). The java class 11 for processing the input personal information is in the middle of processing the personal information input by the user A, as the agent Java class 12 inserts the collection code using Java class byte code modulation (BCI) during java runtime, in the middle of the transaction, the URI (target identifier) and the parameter value (personal information) or the SQL (target identifier) and the parameter value (personal information) that match the pre-identification value of the user B, the target system customer, are collected and obtained (⑤). That is, the URI (target identifier) and the parameter value (personal information) or SQL (target identifier) and the parameter value (personal information) to be encrypted/decrypted are set by the user B.

Afterwards, the acquired data is sent to the application repeater 20 (⑥). The application repeater 20 records whether the encryption is executed in the transaction store 21 to collect whether the encryption/decryption is executed (⑦). In this way, it is not necessary to determine whether to the encryption/decryption occurs later by recording whether the encryption/decryption is executed.

When the data to be encrypted/decryption target is received, the application repeater 20 sends an encryption request to the encryption/decryption performing device 30

(⑧). The encryption/decryption performing device 30 encrypts the plain text personal information that is transmitted from the application repeater 20 using the encryption key that is received from the encryption key storage device (server) 40 and records it in the encryption storage 50 ((⑨)). That is, the encryption storage 50 stores the encrypted value, and the data to be the encryption/decryption target input by the user A is not stored.

The encryption storage 50 records the encryption and returns a non-overlapping encryption record storage identification value corresponding to the encryption to the encryption/decryption performing device 30 ((⑩)). The encryption/decryption performing device 30 sends the encryption record storage identification value to the application repeater 20 ((⑪)).

Afterwards, the application repeater 20 sends the encryption record storage identification value to the agent java class 11 ((⑫)). The agent Java class 12 replaces the encryption record storage identification value received from the application repeater 20 with the plain text personal information before the change, and transmits them to the JDK and JDBC Java class 13 using Java Class Byte Code Instrumentation (BCI) ((⑬)). The JDK and JDBC Java class 13 process the replaced URI (target identifier) and parameter values (personal information) or the SQL (target identifier) and parameter values (personal information) and store them in the database server 14 ((⑭)).

By doing so, the encryption of data related to the personal information is completed, and a value different from the encryption record storage identification value is stored in the web application server 10. As such, in an embodiment of the inventive disclosure, different encrypted values are stored in the database server 14, the encryption storage 50, and the encryption key storage device 40, thereby forming a triple security system. By doing so, the encrypted data is secured even though the server or the device of any one of the devices 14, 40, 50 is lost or hacked.

That is, in an embodiment of the inventive concept, the data between the encryption/decryption server 100 and the web application server 10 is transmitted in a transmission section encryption state (secure socket layer: SSL) that cannot be released by an attacker and non-standard specialized encryption state.

The non-standard specialized encryption means an encryption method in the inventive concept as a method that is distinguished from a standard specialized encryption method such as IPSec used in a VPN. More specifically, the non-standard specialized encryption scheme according to an embodiment of the inventive concept includes a header and a body, the header is transmitted in plain text, and the body includes the target to be encrypted. The header and body are transmitted in a two-way encryption using a specialized encryption key in the encryption/decryption server 100, the receiving side decrypts it, extracts the encryption targets in the body, and encrypts it again using the customer's key, thereby obtaining the encryption record storage identification value. Thereafter, using the specialized encryption key, it is again bi-directionally encrypted and returned to the agent Java class 12. The agent Java class 12 decrypts it again and performs encryption/decryption. In this way, by encrypting in both directions, both encryption and decryption are possible.

In addition, the transmission section encryption (SSL) is a method of authenticating that the agent Java class 12 that transmits data and the repeater 20 that receives data are correct connections with each other, using a certificate, in case of transmitting data from the host other than the agent Java class 12, the repeater 20 is configured to automatically refuse, this means that even though a hacker acquires a message while transmitting the message, the transmission message cannot be read unless decrypted based on authentication.

In addition, an embodiment of the inventive concept discloses a method for decrypting data related to personal information, the decryption method generally follows the reverse order of the encryption method described above.

FIG. 5 is a data flow diagram of core components for decryption related to the inventive concept, hereinafter, the decryption of data (personal information) according to an embodiment of the inventive concept will be described with reference to FIG. 5.

First, the encryption/decryption management control device (server) 60 issues an encryption decryption start command to the application repeater 20 ((①)). The encryption/decryption management control device (server) 60 issues the encryption/decryption start command to the encryption/decryption processing device (server) 30 ((②)). The encryption/decryption processing device (server) 30 that receives the encryption/decryption start command receives a symmetric encryption key necessary for performing encryption/decryption from the encryption key storage device (server) 40 ((③)).

Next, when the user A of the web application server 10 inquires ((④)) the personal information, the java class 11 for processing the personal information creates a query personal information inquiry SQL depending on the request of the user A ((⑤)).

When the transaction that is generated in the java class 11 for processing the personal information is determined to be a decryption request, the agent java class 12 transmits the target request to the JDK and JDBC java class 13 ((⑥)). The JDK and JDBC java class 13 queries and processes the SQL to the database server 14, based on the received personal information inquiry request ((⑦)). The database server 14 returns personal information corresponding to the queried SQL ((⑧)). In this case, the inquired personal information is the encryption record storage identification value input during the encryption.

The JDK and JDBC java class 13 returns the result of the inquiry to the java class 11 for processing the personal information, and the agent Java class 12 intercepts the result using Java Class Byte Code Instrumentation (BCI) before transmitting it to the user A in the middle ((⑨)). The intercepted encrypted value is transmitted to the application repeater 20 as data ((⑩)). The application repeater 20 records whether the decryption is executed at the transaction store 21 for the purpose of recording whether to perform the encryption/decryption collection ((⑪)).

In addition, the application repeater 20 sends the decryption request to the encryption/decryption performing device 30 ((⑫)). The encryption/decryption performing device 30 queries to the encryption storage 50 by using the encryption record storage identification value included in the request message for the purpose of performing the requested decryption ((⑬)). The encryption storage 50 finds the original encryption text by using the encryption record storage identification value and transmits the encryption text to the encryption/decryption performing device 30 ((⑭)). The encryption/decryption performing device 30 converts the received encryption text into plain text by using the symmetric encryption key provided from the encryption key storage device (server) 40 and sends the plain text to the application repeater 20 ((⑮)).

The application repeater 20 transmits personal information that is included the received plain text to the agent java class (12) (⑯). The agent Java class 12 replaces the received plain text personal information with the encryption record storage identification value inquired by the database server 14 and returns the replaced result to the Java class 11 that processes the personal information by using Java Class Byte Code Instrumentation (BCI) (⑰). The java class 11 for processing the personal information provides the user A with the personal information converted into the plain text (⑱).

The personal information is decrypted by the above procedure.

Effects of a data encryption and decryption processing method according to the inventive concept are as follows.

According to at least one of the embodiments of the inventive concept, a program to be encrypted/decrypted in the existing system corresponds to a part of all programs, but an existing method requires full investigation to identify the source program to be encrypted/decrypted. According to an embodiment of the inventive concept, as a URI of a user request and a SQL actually inquired to database are automatically collected, an administrator may conveniently analyze a program source on one screen without needing to analyze program sources one by one. Accordingly, a long time is not required to identify a program to be encrypted/decrypted.

According to at least one of the embodiments of the inventive concept, by automatically changing, through communication with an external encryption/decryption serve, ra value of a final result before the first execution (URI) of the existing running program and after the program execution (SQL), the target program may apply the inventive concept without needing to modify the existing service; unlike the existing method, the degree to which the program is coupled to a system is low, so it is also free to install and uninstall a program later.

According to at least one of the embodiments of the inventive concept, the security may be enhanced through a triple security system in which encryption/decryption related data are distributed and stored into three places The above detailed description should not be construed as limiting in all respects and should be considered as illustrative. The scope of the inventive concept should be determined by reasonable interpretation of the appended claims, and all changes within the equivalent scope of the inventive concept are included in the scope of the inventive concept.

What is claimed is:

1. A data encryption/decryption method including a web server, a web application server (WAS) receiving data from the web server, a database server (DB server) receiving a structured query language (SQL) from the WAS, and an encryption/decryption server to the WAS through a network, the data being transmitted between the encryption/decryption server and the WAS by an application repeater of the encryption/decryption server, the method comprising:

performing encryption by filtering an encryption target by using a uniform resource identifier (URI) when the data is transmitted from the web server and transmitting data to be encrypted to the encryption/decryption server; and performing decryption by filtering a decryption target by using the SQL input from the WAS to the DB server and transmitting data to be decrypted to the encryption/decryption server, and wherein the performing of the encryption includes:

transmitting the URI or the SQL and a parameter input to the web application server to the encryption/decryption server through the application repeater;

determining whether the URI or the SQL and the parameter transmitted to the encryption/decryption server are a preset encryption target;

encrypting the data with an encryption key already assigned by an encryption/decryption processing device of the encryption/decryption server when the URI or the SQL and the parameter are the encryption target;

storing the encrypted value in an encryption storage of the encryption/decryption server;

transmitting an encryption record storage identification value corresponding to the encrypted value to the web application server through the application repeater; and storing a modulated value, which is a result of modulating the transmitted encryption record storage identification value at the web application server, in the DB server.

2. The method of claim 1, wherein the performing of the decryption includes:

determining, by the web server, whether data requested by a user is a preset decryption target;

querying to the database server and transmitting an encryption record storage identification value corresponding to the decryption request to the encryption/decryption server, when the data is the decryption target;

querying the encrypted value to the encryption storage of the encryption/decryption server by using the encryption record storage identification value;

converting the encrypted value into plain text data by using the encrypted value and an encryption key in the encryption/decryption processing device of the encryption/decryption server;

transmitting the plain text data to the application repeater; and replacing the plain text data with the encryption record storage identification value that is stored in the DB server and transmitting a result of the replacement to the user.

3. The method of claim 2, wherein whether the data is the decryption target is determined by using the URI or the SQL and the parameter, which are input.

4. The method of claim 2, wherein the performing of the encryption and the performing of the decryption include recording whether to perform encryption/decryption at a transaction store of the encryption/decryption server.

5. The method of claim 2, wherein the encryption key is provided from an encryption key storage device of the encryption/decryption server, and the encryption key varies depending on the web application server.

* * * * *